United States Patent
Omori

(10) Patent No.: US 11,011,202 B2
(45) Date of Patent: May 18, 2021

(54) RECORDING APPARATUS, RECORDING METHOD, AND STORAGE MEDIUM

(71) Applicant: CANON KABUSHIKI KAISHA, Tokyo (JP)

(72) Inventor: Noboru Omori, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/541,509

(22) Filed: Aug. 15, 2019

(65) Prior Publication Data
US 2020/0075055 A1 Mar. 5, 2020

(30) Foreign Application Priority Data
Aug. 31, 2018 (JP) .............................. JP2018-163619

(51) Int. Cl.
*G11B 19/28* (2006.01)
*G11B 20/10* (2006.01)
*H04N 5/77* (2006.01)

(52) U.S. Cl.
CPC ........ *G11B 19/28* (2013.01); *G11B 20/10527* (2013.01); *H04N 5/772* (2013.01)

(58) Field of Classification Search
CPC ... G11B 19/28; G11B 20/10527; H04N 5/772
See application file for complete search history.

(56) References Cited

U.S. PATENT DOCUMENTS

2015/0036995 A1* 2/2015 Sekiguchi .............. H04N 5/907
386/224

* cited by examiner

*Primary Examiner* — Girumsew Wendmagegn
(74) *Attorney, Agent, or Firm* — Venable LLP

(57) ABSTRACT

There is provided a recording apparatus. A control unit repeatedly executes a recording operation of recording data into a recording medium having a recording area that includes a plurality of partial areas. The control unit performs control so that one partial area included among the plurality of partial areas is used as a recording destination, and when the one partial area is filled with recorded data, another partial area is used as a recording destination. The control unit performs control so that a size of data recorded in a single recording operation does not exceed a remaining size of a partial area that is used as a recording destination in the single recording operation.

12 Claims, 6 Drawing Sheets

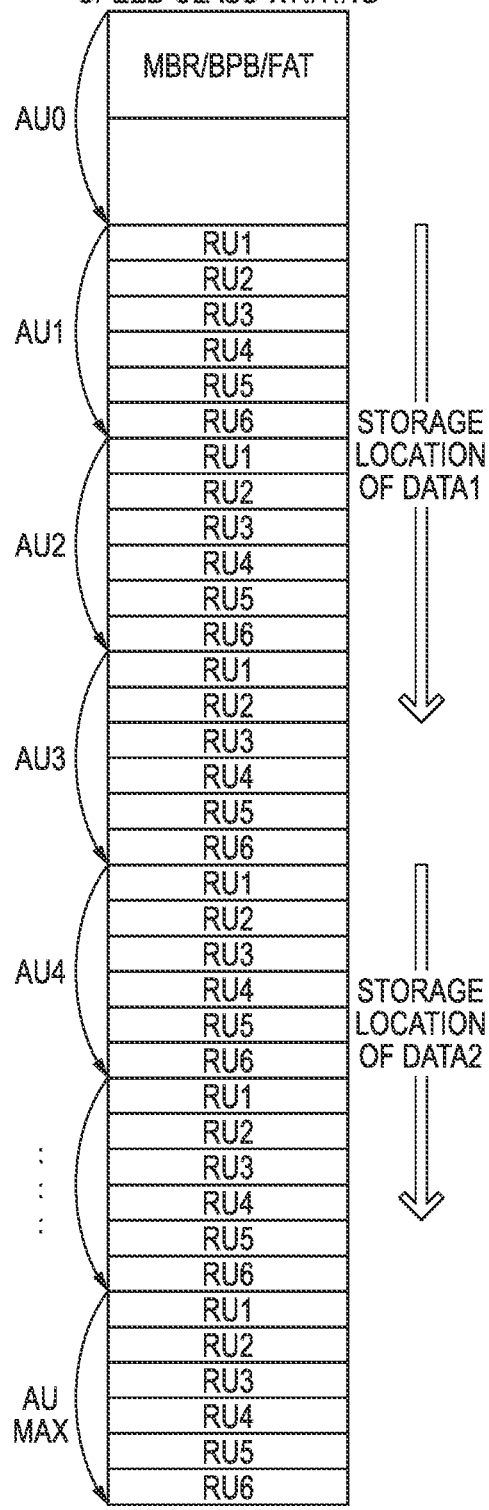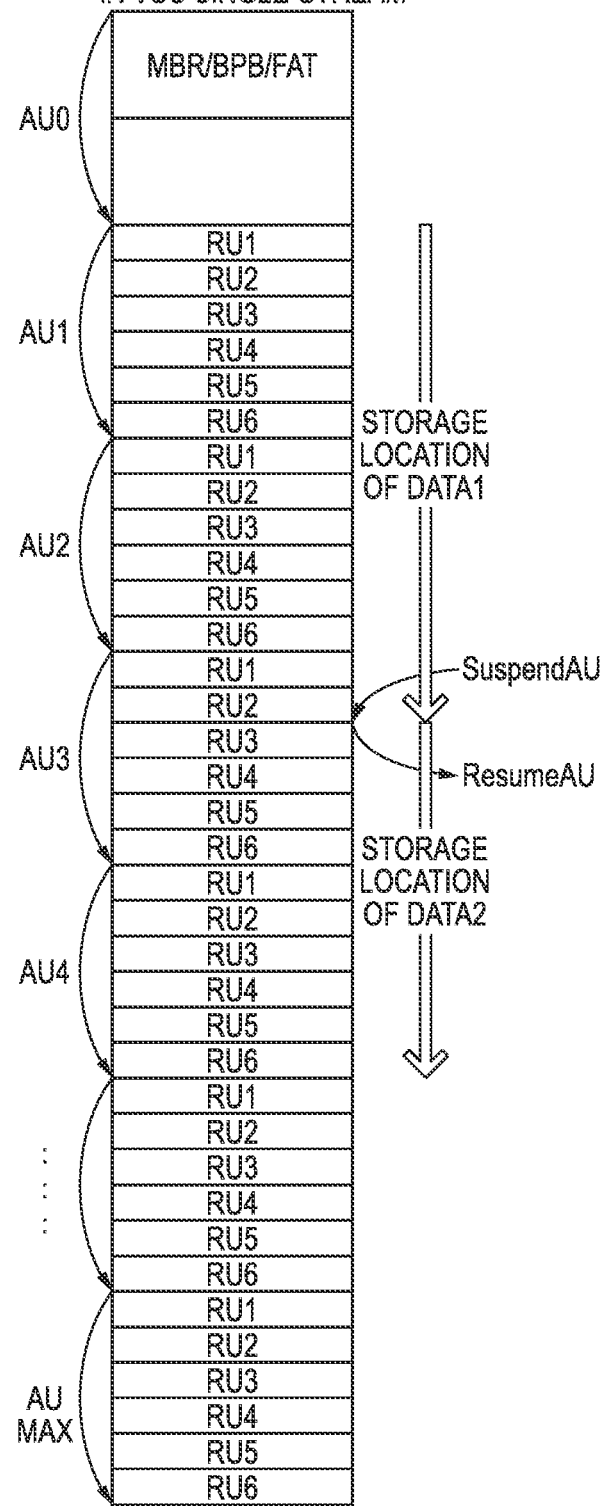

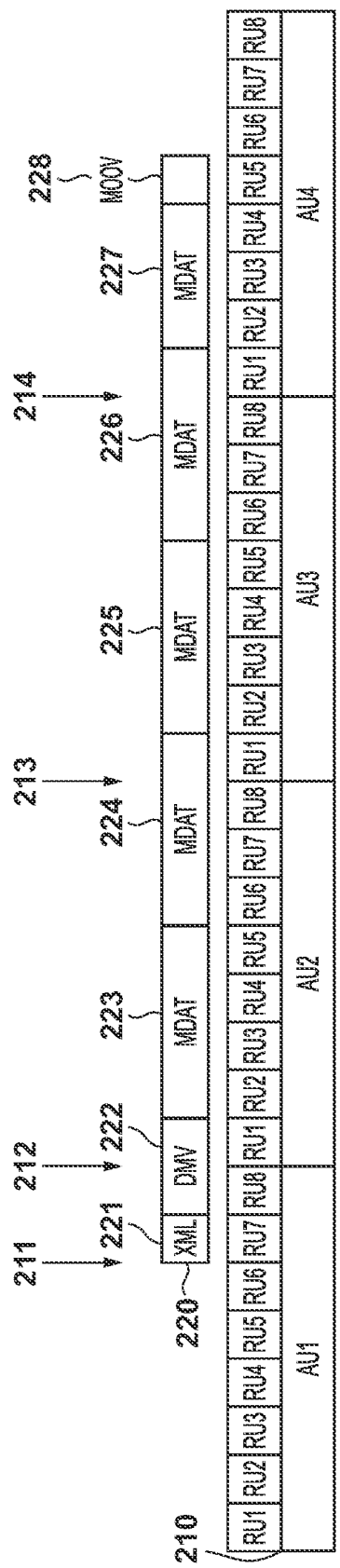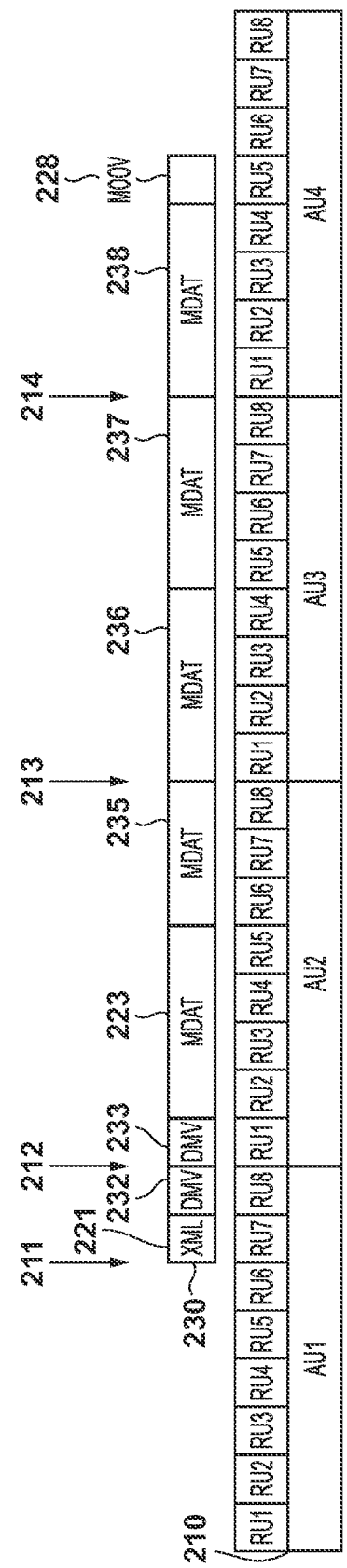

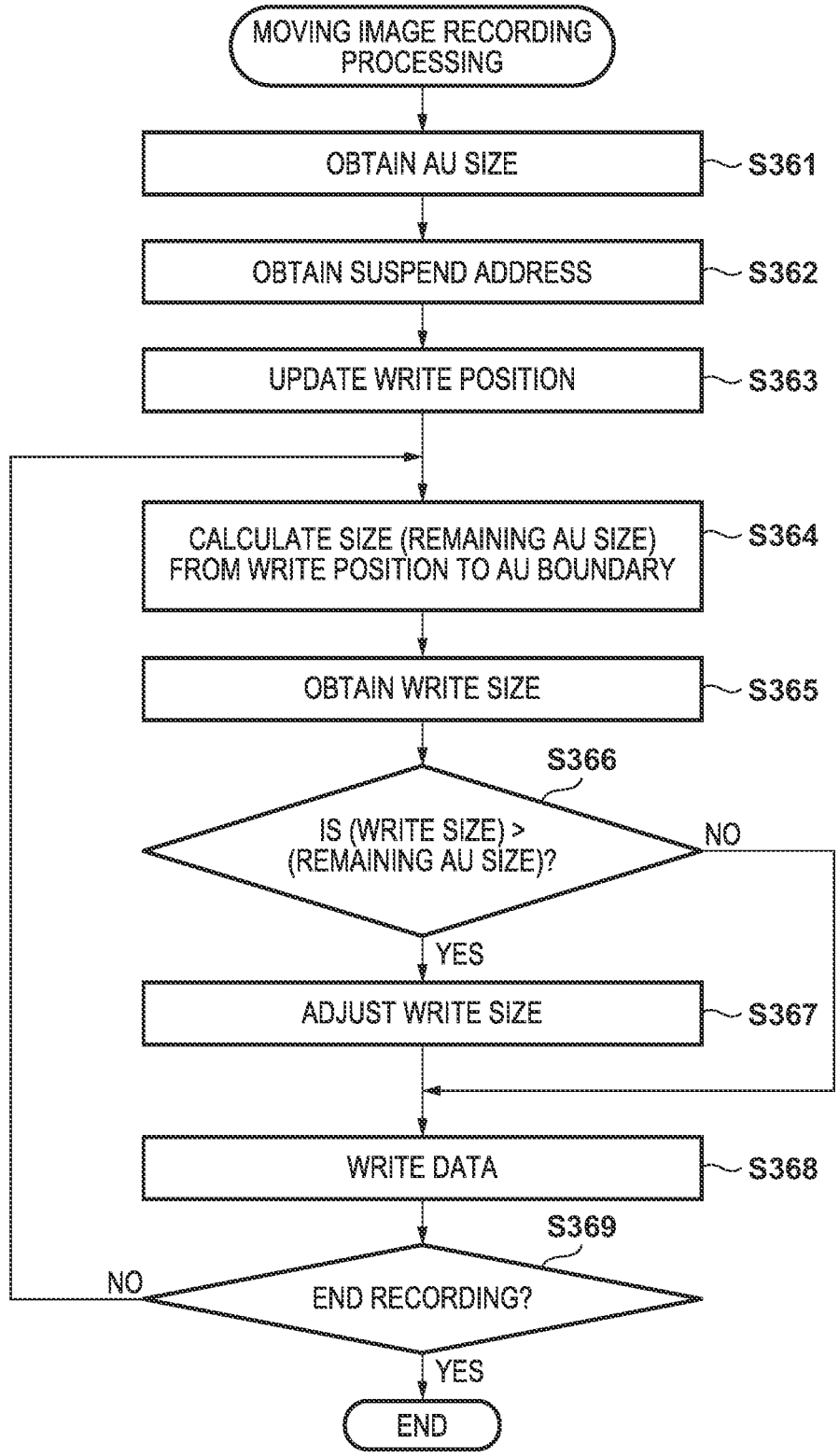

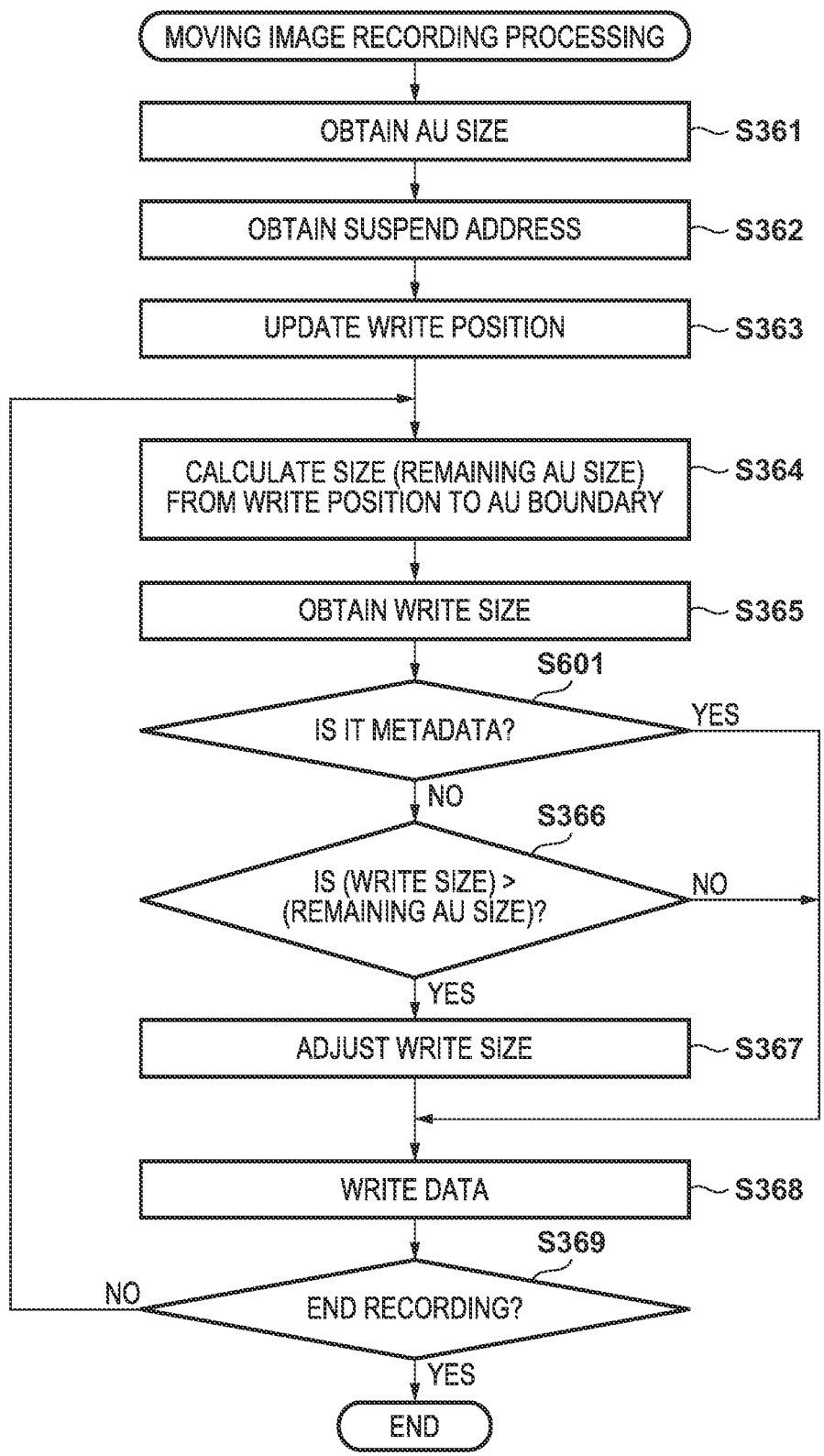

RECORDING APPARATUS, RECORDING METHOD, AND STORAGE MEDIUM

BACKGROUND OF THE INVENTION

Field of the Invention

The present invention relates to a recording apparatus, a recording method, and a storage medium.

Description of the Related Art

Recording apparatuses that record moving image data, still image data, audio data, and the like into a recording medium, such as digital cameras and digital video cameras, are known. Data is managed as a file by a file system, such as FAT16, FAT32, and exFAT.

Some recording mediums support a plurality of writing methods with different writing speeds. A recording apparatus can use writing methods discretely depending on the type of data to be recorded, the necessity of real-time recording, and the like. For example, there is a method in which a recording area is divided into a plurality of areas (Allocation Units, also referred to as AUs), data is recorded continuously from the start of a blank AU in high-speed writing, and data is recorded into a blank area inside an AU in normal writing ("SD Specifications Part 1, Physical Layer, Simplified Specification, Version 5.00"). This writing method takes into consideration the characteristics of a recording medium whereby it takes more time to perform recording into a blank area in an AU that has data recorded in a part thereof than to perform recording into a blank AU (an AU in which no data is recorded). In other words, issuing a writing instruction from the recording apparatus to the recording medium using an AU as a record unit allows for improvement in the recording speed.

The concept of speed classes has been created by applying such characteristics. Speed classes represent a concept in which the recording medium realizes the guarantee of the minimum speed for the recording apparatus by requesting, as a restriction on the recording apparatus side, that a blank AU be searched for and writing be newly performed at the location of the blank AU using an RU as a record unit (a unit obtained by dividing an AU). In this way, a necessary writing speed can be provided to data recording control in which the failure to execute real-time recording, such as recording of moving images, leads to a risk that the recording of the moving images stops eventually.

Furthermore, video speed classes have been proposed as a concept that is similar to speed classes. Video speed classes represent a concept in which the guarantee of an even faster minimum speed is realized by imposing further restrictions on a recording apparatus. According to video speed classes, the maximum AU size is 512 MB, which is eight times as large as the conventional AU size. In addition, a new command called a Set Free AU command is defined, and the recording apparatus is requested to declare, in advance, to a recording medium an AU that is intended to be used. Moreover, commands called a Suspend AU command and a Resume AU command have been added. The Suspend AU command is a command that is used to cause the recording medium to hold a position of an RU in the middle of an AU (hereinafter, a suspend address), whereas the Resume AU command is a command for starting the recording from the suspend address. When the recording apparatus adheres to these restrictions, the minimum speed faster than that according to conventional speed classes can be guaranteed.

According to video speed classes, the concept of multi-stream writing has been additionally introduced as well. According to conventional speed classes, only single-stream data recording can be the target of the speed guarantee. However, according to video speed classes, also in a case where a plurality of files have been recorded simultaneously into one recording medium, they can be the target of the speed guarantee, although in a time-sharing format.

When the data recording has been resumed from the suspend address held in the recording medium using a Resume AU command in conformity with "SD Specifications Part 1, Physical Layer, Simplified Specification, Version 5.00", there is a possibility that the data recording is performed at an address that is not in accordance with an AU boundary, depending on the suspend address and a write unit (e.g., an integral multiple of an RU). In this case, there is a possibility that the recording speed is reduced compared to a case where the data recording is performed at an address that is in accordance with the AU boundary.

SUMMARY OF THE INVENTION

The present invention has been made in view of the aforementioned situation, and provides a technique to suppress a reduction in the recording speed when data is recorded into a recording medium that has a recording area including a plurality of partial areas (e.g., AUs).

According to a first aspect of the present invention, there is provided a recording apparatus, comprising: a control unit configured to repeatedly execute a recording operation of recording data into a recording medium having a recording area that includes a plurality of partial areas, wherein the control unit performs control so that one partial area included among the plurality of partial areas is used as a recording destination, and when the one partial area is filled with recorded data, another partial area is used as a recording destination, and the control unit performs control so that a size of data recorded in a single recording operation does not exceed a remaining size of a partial area that is used as a recording destination in the single recording operation.

According to a second aspect of the present invention, there is provided a recording method executed by a recording apparatus, comprising: repeatedly executing a recording operation of recording data into a recording medium having a recording area that includes a plurality of partial areas; in the repetition of the recording, performing control so that one partial area included among the plurality of partial areas is used as a recording destination, and when the one partial area is filled with recorded data, another partial area is used as a recording destination; and in the repetition of the recording, performing control so that a size of data recorded in a single recording operation does not exceed a remaining size of a partial area that is used as a recording destination in the single recording operation.

According to a third aspect of the present invention, there is provided a non-transitory computer-readable storage medium which stores a program for causing a computer to execute a recording method comprising: repeatedly executing a recording operation of recording data into a recording medium having a recording area that includes a plurality of partial areas; in the repetition of the recording, performing control so that one partial area included among the plurality of partial areas is used as a recording destination, and when the one partial area is filled with recorded data, another partial area is used as a recording destination; and in the repetition of the recording, performing control so that a size of data recorded in a single recording operation does not exceed a remaining size of a partial area that is used as a recording destination in the single recording operation.

Further features of the present invention will become apparent from the following description of exemplary embodiments with reference to the attached drawings.

BRIEF DESCRIPTION OF THE DRAWINGS

FIGS. 1A and 1B are diagrams for describing a method of using RUs at the time of writing in accordance with conventional speed classes and video speed classes.

FIGS. 2A and 2B are conceptual diagrams for comparing a case where AU boundary processing is implemented with a case where the AU boundary processing is not implemented in relation to video speed classes.

FIG. 3 is a flowchart of moving image recording processing accompanied by the AU boundary processing according to a first embodiment.

FIG. 6 is a flowchart of moving image recording processing accompanied by the AU boundary processing according to the second embodiment.

DESCRIPTION OF THE EMBODIMENTS

Figure 4:
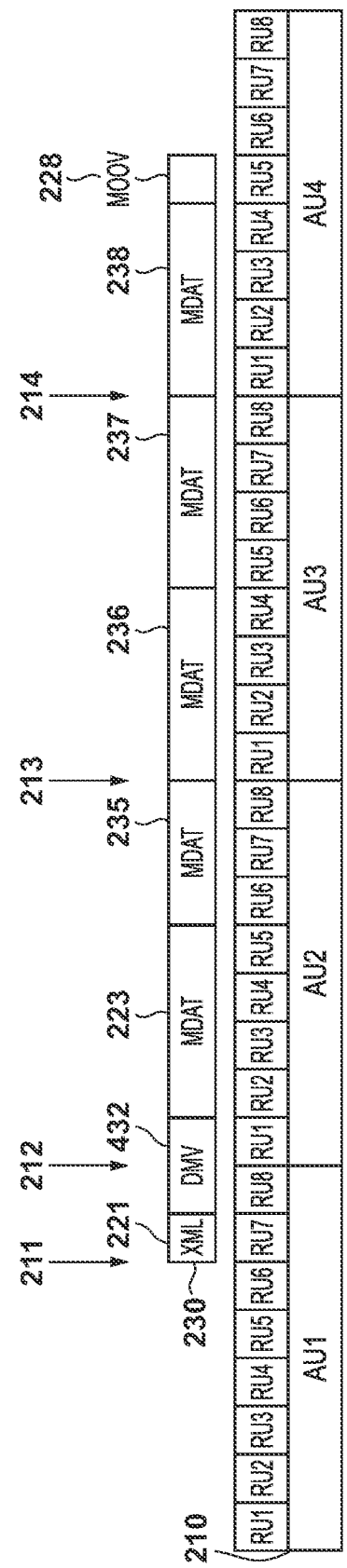
FIG. 4 is a schematic diagram of AU boundary processing according to a second embodiment.

Hereinafter, embodiments of the present invention will be described with reference to the attached drawings. Elements that are given the same reference numerals throughout all of the attached drawings represent the same or similar elements. Note that the technical scope of the present invention is defined by the claims, and is not limited by the following respective embodiments. Also, not all of the combinations of the aspects that are described in the embodiments are necessarily essential to the present invention. Also, the aspects that are described in the individual embodiments can be combined as appropriate.

First Embodiment

Figure 5:
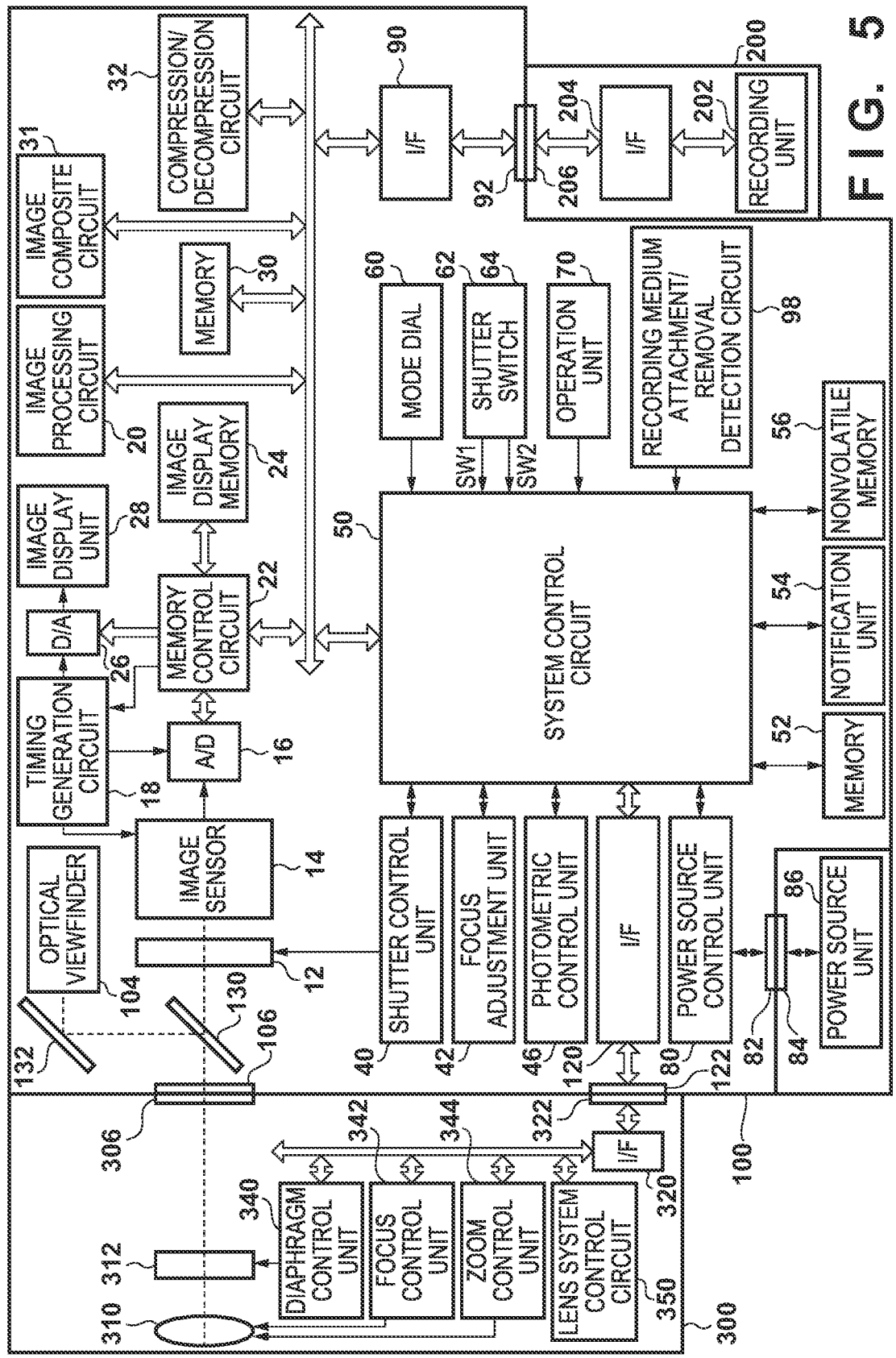
FIG. 5 is a block diagram showing a configuration of a digital video camera.

FIG. 5 is a block diagram showing a configuration of a digital video camera of an interchangeable lens single-lens reflex type, which is one example of a recording apparatus. As shown in FIG. 5, the digital video camera of the present embodiment includes a camera main body 100, and a recording medium 200 and a lens unit 300 of an interchangeable lens type can be attached to the camera main body 100.

In the lens unit 300, 310 denotes an image capturing lens composed of a plurality of lenses, 312 denotes a diaphragm, and 306 denotes a lens mount by which the lens unit 300 is mechanically coupled to the camera main body 100. Various types of members that electrically connect the lens unit 300 to the camera main body 100 are included inside the lens mount 306. 320 denotes an interface (I/F) for connecting the lens unit 300 to the camera main body 100 in the lens mount 306, and 322 denotes a connector that electrically connects the lens unit 300 to the camera main body 100.

The connector 322 has a function of exchanging a control signal, a state signal, a data signal, and the like between the camera main body 100 and the lens unit 300, and also receiving currents of various types of voltages supplied thereto. Furthermore, the connector 322 may be configured to perform not only electrical communication, but also communication using optical communication, audio communication, and the like. 340 denotes a diaphragm control unit that controls the diaphragm 312 based on photometric information from a photometric control unit 46 in coordination with a shutter control unit 40 that controls a later-described shutter 12 of the camera main body 100. 342 denotes a focus control unit that controls focusing of the image capturing lens 310, and 344 denotes a zoom control unit that controls zooming of the image capturing lens 310.

350 denotes a lens system control circuit that controls an entirety of the lens unit 300. The lens system control circuit 350 includes a memory that stores, for example, constants, variables, and programs for operation purposes. Furthermore, the lens system control circuit 350 also includes a nonvolatile memory that holds, for example, identification information (e.g., a number specific to the lens unit 300), management information, function information (e.g., a maximum aperture, a minimum aperture, and a focal length), and various types of current and past setting values.

Next, a description is given of a configuration of the camera main body 100. 106 denotes a lens mount by which the camera main body 100 and the lens unit 300 are mechanically coupled to each other. 130, 132 denote mirrors, and direct a light beam incident on the image capturing lens 310 to an optical viewfinder 104 using a single-lens reflex method. Note that the mirror 130 may have a configuration of an instant return mirror or a configuration of a half mirror; either way is permissible. 12 denotes a shutter of a focal-plane type. 14 denotes an image sensor that is composed of, for example, a CCD or CMOS sensor and photoelectrically converts a subject image. An optical element (not illustrated), such as an optical low-pass filter, is arranged in front of the image sensor 14.

A light beam incident on the image capturing lens 310 is directed using the single-lens reflex method via the diaphragm 312 which is a light amount restricting mechanism, the lens mounts 306 and 106, the mirror 130, and the shutter 12, and is formed on the image sensor 14 as an optical image.

16 denotes an A/D converter that converts an analog signal (output signal) output from the image sensor 14 into a digital signal. 18 denotes a timing generation circuit that supplies a clock signal and a control signal to each of the image sensor 14, the A/D converter 16, and a D/A converter 26. The timing generation circuit 18 is controlled by a memory control circuit 22 and a system control circuit 50.

20 denotes an image processing circuit, and performs predetermined pixel interpolation processing and color conversion processing with respect to data from the A/D converter 16 or data from the memory control circuit 22. Furthermore, the image processing circuit 20 performs predetermined computation processing as necessary using image data output from the A/D converter 16. Autofocus (AF) processing according to a contrast method, automatic exposure (AE) processing, and preliminary flash emission (EF) processing that are intended for the system control circuit 50 to control the shutter control unit 40 and a focus adjustment unit 42 can be performed based on the obtained computation result. Furthermore, the image processing circuit 20 performs predetermined computation processing using image data output from the A/D converter 16, and also performs auto white balance (AWB) processing according to a TTL method based on the obtained computation result.

22 denotes a memory control circuit, and controls the A/D converter 16, the timing generation circuit 18, the image processing circuit 20, an image display memory 24, the D/A converter 26, a memory 30, and a compression/decompression circuit 32. Image data output from the A/D converter 16 is written to the image display memory 24 or the memory 30 via the image processing circuit 20 and the memory control circuit 22, or via the memory control circuit 22 alone.

24 denotes an image display memory, 26 denotes a D/A converter, and 28 denotes an image display unit composed of, for example, an LCD according to a TFT method. Image data for display that has been written to the image display memory 24 is displayed by the image display unit 28 via the D/A converter 26. An electronic viewfinder (EVF) function can be realized by sequentially displaying captured image data using the image display unit 28. Furthermore, the image display unit 28 can arbitrarily turn ON/OFF the display in response to an instruction from the system control circuit 50, and when the display is turned OFF, power consumption of the camera main body 100 can be substantially reduced.

30 denotes a memory for storing shot still images or moving images, and has a storage capacity that is sufficient to store a predetermined number of still images or a predetermined amount of moving images. In this way, a large number of images can be written to the memory 30 at high speed, even in the cases of continuous shooting, in which a plurality of still images are shot continuously, and panoramic shooting. Furthermore, at the time of shooting moving images, the memory 30 is used as a frame buffer for images that are written continuously at a predetermined rate. In addition, the memory 30 can also be used as a working area for the system control circuit 50.

31 denotes an image composite circuit that generates one composite picture by compositing a plurality of images. The image composite circuit 31 simultaneously reads in a plurality of pieces image data that have been written to the memory 30, implements composite processing, and writes composite image data that has been generated to the memory 30. As the composite processing, processing for compositing image data that has been converted by the A/D converter 16 and written by the memory control circuit 22, image data to which image processing has been applied by the image processing circuit 20, and the like is performed.

32 denotes a compression/decompression circuit that compresses and decompresses image data using a known compression method. The compression/decompression circuit 32 reads in an image stored in the memory 30, performs compression processing or decompression processing, and writes data that has completed the processing back to the memory 30. Furthermore, the compression/decompression circuit 32 also has a function of compressing and encoding moving image data into a predetermined format, and a function of generating moving image data by decompressing predetermined compressed encoded data.

40 denotes a shutter control unit, and controls the shutter 12 based on photometric information from the photometric control unit 46 in coordination with the diaphragm control unit 340 that controls the diaphragm 312. 42 denotes a focus adjustment unit for performing AF (autofocus) processing. An in-focus state of an image that has been formed as an optical image can be measured by causing a light beam that has been incident on the image capturing lens 310 inside the lens unit 300 to be incident using the single-lens reflex method via the diaphragm 312, the lens mounts 306, 106, the mirror 130, and a sub-mirror for focus adjustment (not illustrated).

46 denotes a photometric control unit for performing AE (automatic exposure) processing. An exposure state of an image that has been formed as an optical image can be measured by causing a light beam that has been incident on the image capturing lens 310 inside the lens unit 300 to be incident using the single-lens reflex method via the diaphragm 312, the lens mounts 306, 106, the mirror 130, and a photometric sub-mirror (not illustrated).

Also, AF control may be performed using the result of measurement by the focus adjustment unit 42 and the result of computation obtained by the image processing circuit 20 performing computation with respect to image data from the A/D converter 16. Furthermore, exposure control may be performed using the result of measurement by the photometric control unit 46 and the result of computation obtained by the image processing circuit 20 performing computation with respect to image data from the A/D converter 16.

50 denotes a system control circuit that controls an entirety of the camera main body 100, and includes, for example, a known CPU embedded therein. 52 denotes a memory that stores, for example, constants, variables, and programs for the operations of the system control circuit 50.

54 denotes a notification unit for notifying the outside of, for example, an operation state and a message using characters, images, audio, and the like in accordance with the execution of programs by the system control circuit 50. For example, a display unit that performs visual display using, for example, an LCD, an LED, etc., or a sound producing element that performs notification using audio is used as the notification unit 54. The notification unit 54 may be configured by a combination of one or more of these display unit, sound producing element, and the like. In particular, the display unit is installed in one or more regions that are in the vicinity of an operation unit 70 of the camera main body 100 and are easily visible. Furthermore, a part of the functions of the notification unit 54 is provided inside the optical viewfinder 104.

Among display contents of the notification unit 54, contents that are displayed on the image display unit 28, such as an LCD, are as follows. First, there is display related to a shooting mode, such as single shooting/continuous shooting display and self-timer display. Also, there is display related to recording, such as compression ratio display, display of the number of pixels to be recorded, display of the number of images to be recorded, and display of the remaining number of images that can be shot. Furthermore, there is display related to shooting conditions, such as shutter speed display, aperture display, exposure correction display, light control correction display, display of the amount of light emission by an external flash, and red-eye alleviation display. Other than the above, there are macro shooting display, buzzer setting display, display of a remaining battery level, error display, information display using a multiple-digit number, and display of an attached/removed state of the recording medium 200. In addition, display of an attached/removed state of the lens unit 300, display of communication I/F operations, date/time display, display indicating the state of connection with an external computer, and the like are also performed.

Among display contents of the notification unit 54, contents that are displayed inside the optical viewfinder 104 are as follows. In-focus display, shooting preparation completion display, camera shake warning display, flash charging display, flash charging completion display, shutter speed display, aperture display, exposure correction display, display of an operation of writing to a recording medium, and the like are performed.

56 denotes an electrically erasable and recordable non-volatile memory that stores a later-described program and the like; for example, an EEPROM or the like is used thereas. 60, 62, 64, and 70 denote operation members for inputting instructions related to various types of operations of the system control circuit 50, and are configured by a combination of one or more of a switch, a dial, a touchscreen, pointing based on eye-gaze detection, an audio recognition apparatus, and the like.

Below is a specific description of these operation members. 60 denotes a mode dial switch, and can switch among and set various function shooting modes including an automatic shooting mode, a program shooting mode, a shutter speed priority shooting mode, a diaphragm priority shooting mode, a manual shooting mode, a depth of focus priority (depth) shooting mode, and the like. Other than the above, it can also switch among and set various function shooting modes including a portrait shooting mode, a landscape shooting mode, a closeup shooting mode, a sports shooting mode, a night scene shooting mode, a panoramic shooting mode, and the like.

62 denotes a shutter switch SW1; in the midst of an operation on a non-illustrated shutter button (e.g., when the shutter button is pressed halfway), it is turned ON and issues an instruction for starting operations of AF processing, AE processing, AWB processing, EF processing, and the like.

64 denotes a shutter switch SW2; upon completion of the operation on the non-illustrated shutter button (e.g., when the shutter button is fully pressed), it is turned ON and issues an instruction for starting operations of a processing sequence composed of exposure processing, development processing, and recording processing. First, in the exposure processing, processing for writing a signal that has been read out from the image sensor 14 to the memory 30 via the A/D converter 16 and the memory control circuit 22 is performed. Then, the development processing that uses computation in the image processing circuit 20 and the memory control circuit 22 is performed. Furthermore, in the recording processing, processing for reading out image data from the memory 30, compressing the image data in the compression/decompression circuit 32, and writing the image data to the recording medium 200 is performed.

70 denotes an operation unit composed of various buttons, a touchscreen, and the like. For example, the operation unit 70 includes a live-view start/stop button, a moving image recording start/stop button, a menu button, a set button, a multi-screen reproduction page break button, a flash setting button, and a single shooting/continuous shooting/self-timer switch button. Furthermore, the operation unit 70 includes a menu transition + (plus) button and a menu transition − (minus) button. In addition, the operation unit 70 also includes a reproduced image transition + (plus) button, a reproduced image transition − (minus) button, a shooting image quality selection button, an exposure correction button, a light control correction button, a button for setting the amount of light emission by an external flash, a date/time setting button, and the like. Note that regarding various functions of the aforementioned plus buttons and minus buttons, numeric values and functions can be selected more swiftly by providing the operation unit 70 with a rotary dial switch. The operation unit 70 also includes an image display ON/OFF switch that sets ON/OFF of the image display unit 28, and a quick review ON/OFF switch that sets a quick review function of automatically reproducing shot image data immediately after shooting. Furthermore, the operation unit 70 includes a compression mode switch, which is a switch for selecting a compression ratio of JPEG compression, or for selecting a RAW mode in which a signal of the image sensor 14 is digitalized and recorded into a recording medium as is. Moreover, the operation unit 70 includes an AF mode setting switch that can set a one-shot AF mode and a servo AF mode. In the one-shot AF mode, an autofocus operation is started upon pressing of the shutter switch SW1 62, and if focus is achieved, control for maintaining that in-focus state is performed. In the servo AF mode, the autofocus operation is performed continuously while the shutter switch SW1 62 is being pressed.

80 denotes a power source control unit, and is composed of a battery detection circuit, a DC-DC converter, a switch circuit that switches between blocks to which currents are supplied, and the like. The power source control unit 80 detects whether a battery is mounted, a battery type, and a remaining battery level, controls the DC-DC converter based on the detection results and an instruction of the system control circuit 50, and supplies a necessary voltage to various units, including the recording medium 200, for a necessary period of time.

82 and 84 denote connectors. 86 denotes a power source unit composed of a primary battery (e.g., an alkaline battery and a lithium battery), a secondary battery (e.g., a NiCd battery, a NiMH battery, a Li-ion battery, and a Li polymer battery), an AC adapter, and the like.

90 denotes an interface (I/F) for a recording medium (e.g., a memory card and a hard disk), a PC, and the like. 92 denotes a connector that connects to a recording medium (e.g., a memory card and a hard disk), a PC, and the like. 98 denotes a recording medium attachment/removal detection circuit that detects whether the recording medium 200 is attached to the connector 92.

The I/F 90 and the connector 92 can be configured using elements that are compliant with the standards of various types of recording mediums that can be used as the recording medium 200. The various types of recording mediums mentioned here are, for example, a PCMCIA (Personal Computer Memory Card International Association) card, a CF (CompactFlash®) card, an SD card, and the like. When the I/F 90 and the connector 92 are configured using elements that are compliant with the standards of the PCMCIA card, the CF card, and the like, various types of communication cards can be connected to the connector 92. The communication cards include a LAN card, a modem card, a USB (Universal Serial Bus) card, an IEEE (Institute of Electrical and Electronic Engineers) 1394 card, and the like. The communication cards also include a P1284 card, an SCSI (Small Computer System Interface) card, a PHS, and the like, in addition to the above. Connecting these various types of communication cards to the connector 92 enables the camera main body 100 and a peripheral device, such as another computer and printer, to transfer image data and management information attached to the image data to each other.

104 denotes an optical viewfinder. A light beam incident on the image capturing lens 310 can be directed to the optical viewfinder 104 using the single-lens reflex method via the diaphragm 312, the lens mounts 306, 106, and the mirrors 130, 132, and formed and displayed as an optical image. In this way, shooting can be performed using the optical viewfinder 104 alone without using the electronic viewfinder function provided by the image display unit 28. Furthermore, inside the optical viewfinder 104, the notification unit 54 performs partial display (e.g., display of an in-focus state, camera shake warning, flash charging, a shutter speed, an aperture, exposure correction, and the like).

120 denotes an interface (I/F) for connecting the camera main body 100 to the lens unit 300 inside the lens mount 106. 122 denotes a connector that electrically connects the camera main body 100 to the lens unit 300. Also, whether the lens unit 300 is attached to the lens mount 106 and the connector 122 is detected by a non-illustrated lens attachment/removal detection unit. The connector 122 has a function of exchanging a control signal, a state signal, a data signal, and the like between the camera main body 100 and the lens unit 300, and also supplying currents of various types of voltages. Furthermore, the connector 122 may be configured to perform not only electrical communication, but also communication via optical communication and audio communication.

In the present embodiment, the recording medium 200 is a memory card. The recording medium 200 includes a recording unit 202 composed of a semiconductor memory, an I/F 204 (interface) for the camera main body 100, and a connector 206 that connects to the camera main body 100.

In the present embodiment, it will be assumed that a memory card compliant with the SD standards of the SD Card Association (an SD card) is used as the recording medium 200. The camera main body 100 can record moving images using a writing method conforming to speed class specifications of the SD standards (speed class writing). The speed class specifications are specifications that guarantee the minimum speed in recording data continuously into the SD card.

In speed class writing, a recording area (User Area) is managed in units of AU (Allocation Unit), which is a partial area having a fixed size. One AU is composed of a plurality of RUs (Recording Units) (an AU has a predetermined number of RUs). The RU size varies depending on the card type (SDSC, SDHC, SDXC) and the speed class type; according to the current standards, the RU size is a multiple of 16 KB, and is 512 KB at most. An RU has a size that is an integral multiple of a cluster (the smallest management unit) of the recording medium. Speed class writing is performed only with respect to a blank AU (an AU that does not include RUs in which data is recorded). An AU that includes RUs in which data is recorded is called a fragmented AU.

Note that the present embodiment is also applicable to a recording apparatus that uses a recording medium of other standards supporting writing methods that manage a recording area in different units. Examples of such a recording medium include a CF card and a CFast card. Regarding the CF card and the CFast card, VPG (Video Performance Guarantee) is set as a writing method that guarantees the minimum recording speed.

Below, the present embodiment will be described in more detail using an exemplary case in which the recording medium 200 is an SD card.

FIGS. 1A and 1B are diagrams for describing a method of using RUs at the time of writing in accordance with conventional speed classes and video speed classes. FIGS. 1A and 1B schematically show a logical address map encompassing the concept of AUs and RUs in the recording unit 202. Although MBR (Master Boot Record), BPB (BIOS Parameter Block), and FAT (File Allocation Table) are shown here as examples of system information, the system information is not limited to these. Note that as the system information that is exemplarily shown here is known, a description of its details will be omitted.

Using a logical address map format, FIG. 1A schematically shows how writing is started and ended with respect to two pieces of data in relation to the method of using RUs at the time of conventional speed class writing. The following particularly focuses on the method of using RUs at the time of starting the writing of the second piece of data (at the time of resuming the writing after the writing of the first piece of data is ended).

First, a blank AU in which all RUs do not logically contain data is searched for. The blank AU is searched for because, due to the aforementioned characteristics of the recording medium, writing data to the blank AU can bring out the speed performance of the recording medium to the fullest.

Next, processing for writing data having an RU-based size to the discovered blank AU is performed. Then, when the RUs inside the discovered blank AU have become full (filled with recorded data), processing for searching for the next blank AU and filling the same with data in units of RU in a similar manner is performed. By performing the recording sequentially while repeating the foregoing, the writing for the first file (first piece of data) is ended. Next, when the second file (second piece of data) is to be generated, processing for searching for a blank AU and writing data to the same in units of RU is performed, similarly to the control related to the first file. If the writing for the first file was not ended in units of AU (that is, if the writing was ended at a position of an RU in the middle of an AU), the remaining RUs in this AU cannot be used at the time of the writing for the second file. Therefore, the remaining RUs in this AU (RU3 to RU6 in AU3 in the example of FIG. 1A) represent an area that cannot be used as a speed class area.

Using a logical address map format, FIG. 1B schematically shows how writing is started and ended with respect to two pieces of data in relation to single-stream writing, which is a general method of using a video speed class immediately after the SD card is formatted. Similarly to the case of FIG. 1A, the following particularly focuses on the method of using RUs at the time of starting the writing of the second piece of data (at the time of resuming the writing after the writing of the first piece of data is ended).

Regarding the first file, similarly to conventional speed classes, processing for searching for a blank AU and writing data in units of RU is performed. However, the camera main body 100 needs to declare, in advance, to the recording medium 200 an AU that is intended to be used by issuing a Set Free AU command before performing the writing in units of RU. Writing data to a location other than the AU designated by this Set Free AU is considered a violation of restrictions of video speed classes, with the result that the minimum speed is not guaranteed.

For the recording medium 200, the use of the Set Free AU has the advantage that, even if old data exists in a target AU, it is possible to switch to a mode in which continuous writing is expected with the invalidation of the old data. Therefore, benefits can be achieved in a long-term perspective in the sense that garbage collection by fragmentation of the recording medium 200 can be prevented. However, as the camera main body 100 needs to issue the command on a regular basis, at the same time there is also a disadvantage that command overhead occurs and the camera main body 100 cannot access the recording medium 200 during the occurrence of the command overhead.

According to video speed classes, the camera main body 100 accesses the recording medium 200 by combining the Set Free AU and an actual RU-based write instruction. Furthermore, control at the time of ending the writing of the first piece of data and at the time of starting the writing of the second piece of data also differs from conventional speed classes. Specifically, the camera main body 100 issues a Suspend AU command at the time of ending the writing of the first piece of data, and issues a Resume AU command at the time of starting the writing of the second piece of data. The Suspend AU command is a command that stores a position of an RU in the middle of an AU (hereinafter, a suspend address) into the recording medium 200. On the other hand, the Resume AU command is a command for starting the recording from the suspend address stored in the recording medium 200. Furthermore, an ACMD13 command is a command for obtaining the suspend address from the recording medium 200. As the suspend address is stored in the recording medium 200, it is not lost even if the power of the camera main body 100 is turned OFF and ON. The writing of the second piece of data is started from the RU indicated by the suspend address (RU3 in AU3 in the example of FIG. 1B).

As described above, according to video speed classes, the method of using RUs and the file control method differ from conventional speed classes. Therefore, according to video speed classes, the guaranteed minimum speed is further increased, and the amount of free space can be used more effectively. However, as restrictions for realizing the foregoing, video speed classes require a large number of commands to be issued compared to conventional speed classes. Furthermore, according to conventional speed classes, the recording for the second or subsequent piece of data is also started from the first RU of an unused AU (blank AU); on the other hand, according to video speed classes, the recording is started from an RU in the middle of a currently-used AU, that is, from a suspend address. In the present embodiment, processing for suppressing a reduction in the recording speed under such circumstances (hereinafter referred to as "AU boundary processing") will be described.

FIGS. 2A and 2B are conceptual diagrams for comparing a case where the AU boundary processing is implemented with a case where the AU boundary processing is not implemented in relation to video speed classes. FIG. 2A corresponds to the case where the AU boundary processing is not implemented, whereas FIG. 2B corresponds to the case where the AU boundary processing is implemented.

In FIGS. 2A and 2B, 210 denotes positions of AUs and RUs in the recording medium 200. 220 denotes moving image data that was recorded into the recording medium 200 without implementing the AU boundary processing, and 230 denotes moving image data that was recorded into the recording medium 200 along with the implementation of the AU boundary processing. Moving image data includes metadata, such as moving image index data, and moving image stream data.

The moving image index data includes DMV 222, 232, 233, MOOV 228, and the like composed of, for example, indexes of images, audio, and timecodes, and is recorded at the start and the end of the moving image data. In the present embodiment, DMV is recorded at the start of an image file, and MOOV is recorded at the end of the image file.

A write unit (write size) of DMV and a write unit (write size) of MOOV are preset in accordance with a format of moving images to be recorded. The write units (write sizes) of DMV and MOOV are set in advance to sizes with which their respective pieces of data can be recorded through single writing. It will be assumed that, in FIGS. 2A and 2B, the write size of DMV is set to a size corresponding to two RUs, and the write size of MOOV is set to a size corresponding to one RU.

The moving image stream data includes MDAT 223, 224, 225, 226, 227, 235, 236, 237, 238, and the like composed of, for example, images, audio, and timecodes. When moving images of a long duration are recorded, the data size becomes large, and thus processing for dividing the moving image stream data into a plurality of pieces on a per-write unit basis and recording them on a regular basis is performed. A write unit of the moving image stream data is a size which is an integral multiple of an RU and by which an AU is divisible (a size obtained by dividing an AU size by an integer). In the digital video camera of the present embodiment, the write unit (write size) of the moving image stream data is set to a size corresponding to four RUs (½ of an AU).

With reference to FIG. 2A, the following describes the case where the AU boundary processing is not implemented. 211 denotes a position indicated by a suspend address that the camera main body 100 obtained from the recording medium 200 using the ACMD13 command. When the recording of moving images has been started, the camera main body 100 records moving image data (a moving image file) including moving image stream data and metadata by repeatedly executing a recording operation of recording data into the recording medium 200 (repeating the recording operation multiple times). In the first recording operation, the camera main body 100 records XML 221 as data attached to the moving image data. As a recording start address is the suspend address 211, XML 221 is recorded into RU7 in AU1. Below, an RU inside a specific AU will be expressed in a form like "AU1-RU7".

Subsequently, the camera main body 100 records DMV 222 as moving image index data in the next recording operation. As the size of DMV 222 and the write size of DMV correspond to two RUs, DMV 222 is recorded into AU1-RU8 to AU2-RU1. At this time, DMV 222 (data that is recorded through a single recording operation) crosses over an AU boundary 212 (a boundary between AU1 and AU2). As a result, the speed performance of the recording medium 200 cannot be brought out sufficiently. That is, as the recording is performed crossing over the AU boundary, VSC-based recording cannot be performed, and the recording speed decreases compared to a case where VSC-based writing is performed without crossing over the AU boundary 212.

Next, the camera main body 100 records MDAT 223 as the moving image stream data. MDAT 223 has a size conforming to the preset write unit of the moving image stream data, that is, a size corresponding to four RUs, and is recorded into AU2-RU2 to AU2-RU5.

The camera main body 100 further continues the recording of the moving image stream data, and records MDAT 224. MDAT 224 is recorded into AU2-RU6 to AU3-RU1. The camera main body 100 repeats the recording operation for the moving image stream data based on the write unit until a recording stop instruction is issued. In the example of FIG. 2A, the camera main body 100 further records MDAT 225, 226.

When the recording operation for a moving image stream is performed in the above-described manner, MDAT 224 crosses over an AU boundary 213 (a boundary between AU2 and AU3), and MDAT 226 crosses over an AU boundary 214 (a boundary between AU3 and AU4). As a result, the speed performance of the recording medium 200 cannot be brought out sufficiently. As the write unit of MDAT is a size by which the AU size is divisible, once the recording has been performed crossing over a boundary, the recording thereafter is also performed crossing over a boundary.

Upon issuance of the recording stop instruction, the camera main body 100 records a portion (MDAT 227) that is smaller than the write unit of the moving image stream data. MDAT 227 is recorded into AU4-RU2 to AU4-RU4.

Thereafter, the camera main body 100 records MOOV 228 as moving image index data. MOOV 228 is recorded into AU4-RU5.

While the example of FIG. 2A has been described in relation to a case where MDAT data is recorded into 19 RUs, there is a possibility that writing that crosses over an AU boundary occurs on a regular basis and the speed performance of the recording medium 200 cannot be brought out sufficiently also in a case where moving image data of a longer duration is recorded.

Next, with reference to FIG. 2B, a description is given of the case where the AU boundary processing is implemented. Below, a description of the matters that have already been described with reference to FIG. 2A will be omitted, and only the matters that are different therefrom will be described.

After recording XML 221, the camera main body 100 records DMV 232, 233 as moving image index data. At this time, the camera main body 100 compares the write size of DMV (a total size of DMV 232, 233) with a size from the current write position to an AU boundary (hereinafter referred to as a "remaining AU size"). As the write size of DMV is larger than the remaining AU size, the camera main body 100 makes the write size of DMV match the remaining AU size (temporarily changes the recording size). That is, out of DMV to be written (corresponding to DMV 222 of FIG. 2A), a portion corresponding to the remaining AU size (DMV 232) is recorded into AU1-RU8 by the camera main body 100. In this way, the size of data that is recorded through a single recording operation does not exceed the remaining size of an AU that is used as a recording destination at the time of starting the single recording operation, and writing that crosses over the AU boundary 212 is avoided. Thereafter, the camera main body 100 records the remaining portion (DMV 233) of DMV to be written (corresponding to DMV 222 of FIG. 2A) into AU2-RU1.

Next, the camera main body 100 records MDAT 223, and then records MDAT 235. At this time also, the camera main body 100 compares the write unit of the moving image stream data with the remaining AU size, and makes the write size of MDAT match the remaining AU size. That is, the camera main body 100 records MDAT 235 that is smaller than the original write unit into AU2-RU6 to AU2-RU8. In this way, the size of data that is recorded through a single recording operation does not exceed the remaining size of an AU that is used as a recording destination at the time of starting the single recording operation, and writing that crosses over the AU boundary 213 is avoided.

The camera main body 100 further continues the recording of the moving image stream data, and records MDAT 236. At the time of the recording of MDAT 235, 236, writing that crosses over the AU boundary 213 does not occur, thereby suppressing a reduction in the recording speed of the recording medium 200. The camera main body 100 repeats the recording of the moving image stream data based on the write unit until the recording stop instruction is issued. In the example of FIG. 2B, the camera main body 100 records MDAT 237.

Upon issuance of the recording stop instruction, the camera main body 100 records a portion (MDAT 238) that is smaller than the write unit of the moving image stream data. MDAT 238 is recorded into AU4-RU1 to AU4-RU4. At this time also, writing that crosses over the AU boundary 214 does not occur, thereby suppressing a reduction in the recording speed of the recording medium 200.

The example of FIG. 2B has been described in relation to a case where MDAT data is recorded into 19 RUs. Also in a case where moving image data of a longer duration is recorded, as an adjustment is made so that the write size does not cross over an AU boundary at the AU boundaries 212, 213, an AU boundary is never crossed over at the time of recording the moving image stream data thereafter, thereby suppressing a reduction in the recording speed of the recording medium 200.

Next, with reference to FIG. 3, a description is given of moving image recording processing accompanied by the AU boundary processing according to the first embodiment. The processing of a flowchart of FIG. 3 is started when a recording start instruction for moving images has been issued to the camera main body 100. Processing of each step of the present flowchart is realized by the system control circuit 50 of the camera main body 100 loading a program stored in the nonvolatile memory 56 to the memory 52 and executing the program, unless specifically stated otherwise.

In step S361, the system control circuit 50 obtains an AU size from the recording medium 200. In step S362, the system control circuit 50 obtains a suspend address (a recording start position for the first recording operation) from the recording medium 200. Note that the AU size and the suspend address can be obtained from the recording medium 200 by transmitting an ACMD13 command to the recording medium 200. Also, these pieces of information may be obtained in advance in order to start the moving image recording processing, rather than after the moving image recording processing is started. In step S363, the system control circuit 50 sets the suspend address as a write position in the recording medium 200. Specifically, recording can be started from the suspend address according to VSC by issuing a Resume AU command and then a Start Rec command to the recording medium 200.

In step S364, the system control circuit 50 calculates a size from the write position to an AU boundary (a remaining AU size). For example, when the AU size corresponds to eight RUs and the write position is the first RU inside an AU, the remaining AU size corresponds to eight RUs. Alternatively, when the AU size corresponds to eight RUs and the write position is the seventh RU inside an AU, the remaining AU size corresponds to two RUs.

In step S365, the system control circuit 50 calculates a write size of data to be recorded (e.g., XML, DMV, MDAT, and MOOV). In step S366, the system control circuit 50 compares the write size with the remaining AU size. If the write size is larger than the remaining AU size, the processing proceeds to step S367, and if the write size is not larger than the remaining AU size, the processing proceeds to step S368.

In step S367, the system control circuit 50 adjusts the write size. Specifically, the system control circuit 50 uses the remaining AU size as the write size. In this way, the execution of writing that crosses over the AU boundary can be avoided. Note that in the present embodiment, data to be adjusted in terms of the write size refers to general moving image data, such as XML, DMV, MDAT, and MOOV.

In step S368, the system control circuit 50 writes data corresponding to the write size into the recording medium 200. At this time, the system control circuit 50 updates the write position in preparation for the next recording operation.

In step S369, the system control circuit 50 determines whether to end the recording of the moving images. If the recording of the moving images is to be ended (for example, if a recording stop instruction has been issued to the camera main body 100), the processing of the present flowchart ends. If the recording of the moving images is not to be ended, the processing returns to step S364.

As described above, according to the first embodiment, the camera main body 100 performs control so that the size of data to be recorded through a single recording operation does not exceed the remaining size of an AU that is used as a recording destination at the time of starting the single recording operation. More specifically, when the size of data to be recorded in the next recording operation exceeds the remaining size of an AU, the camera main body 100 adjusts the size of the data to be recorded so that it matches the remaining size of the AU. This can suppress a reduction in the recording speed when data is recorded into a recording medium that has a recording area including a plurality of partial areas (e.g., AUs). Furthermore, the above has described a case where the write size is adjusted when the first recording operation is started from a suspend address using a Resume AU command. In contrast, processing for adjusting the write size may not be performed when the recording is started from the first position of an AU without using a Resume AU command, or when the recording is performed according to a speed class other than VSC.

Note that in the above description, it is assumed that the camera main body 100 writes pieces of data of XML, DMV, MDAT, and MOOV separately from one another. However, the AU boundary processing of the present embodiment is also applicable to a configuration in which a plurality of types of data are collectively recorded, as data to be recorded, into the recording medium 200 through single writing. For example, the camera main body 100 may perform control so that the write size does not exceed the remaining AU size also in a case where parts of DMV and MDAT are collectively recorded into the recording medium 200 through single writing.

Second Embodiment

In the first embodiment, data to be adjusted in terms of the write size refers to general moving image data, such as XML, DMV, MDAT, and MOOV. In contrast, a second embodiment will be described in relation to a configuration in which only moving image stream data (MDAT) is to be adjusted in terms of the write size. The reason for adopting such a configuration is that an adjustment of the write size of metadata (moving image index data and attached data) is relatively difficult. Regarding the moving image stream data, it is often managed in a ring buffer in the camera main body 100, and an adjustment of its write size is relatively easy.

In the second embodiment, basic configurations of the camera main body 100, the recording medium 200, and the lens unit 300 are similar to those of the first embodiment (see FIG. 5). The following mainly describes a point that is different from the first embodiment.

FIG. 4 is a schematic diagram of AU boundary processing according to the second embodiment. In the example of FIG. 4, writing that crosses over an AU boundary 212 is performed at the time of recording DMV 432. This point is the point that is different from FIG. 2B corresponding to the first embodiment (in FIG. 2B, DMV 232 and DMV 233 are written separately from each other in order to avoid writing that crosses over the AU boundary 212), and other points are similar to FIG. 2B.

Next, with reference to FIG. 6, a description is given of moving image recording processing accompanied by the AU boundary processing according to the second embodiment. The processing of a flowchart of FIG. 6 is started when a recording start instruction for moving images has been issued to the camera main body 100. Processing of each step of the present flowchart is realized by the system control circuit 50 of the camera main body 100 loading a program stored in the nonvolatile memory 56 to the memory 52 and executing the program, unless specifically stated otherwise.

Following the processing of step S365, the system control circuit 50 determines whether data to be recorded in the next recording operation is a predetermined type of data (metadata in the example of FIG. 6). If the data to be recorded is metadata, the processing proceeds to step S368. If the data to be recorded is not metadata (that is, if the data to be recorded is moving image stream data), the processing proceeds to step S366. In this case, the adjustment of the write size (step S367) is not performed regardless of the magnitude relationship between the write size and the remaining AU size. Therefore, in the moving image recording processing of the present embodiment, while there is a possibility that the write size of the moving image stream data is adjusted, the write size of metadata (e.g., moving image index data), which is data other than the moving image stream data, is not adjusted.

Note that in the above description, it is assumed that the camera main body 100 writes pieces of data of XML, DMV, MDAT, and MOOV separately from one another. However, the AU boundary processing of the present embodiment is also applicable to a configuration in which a plurality of types of data are collectively recorded, as data to be recorded, into the recording medium 200 through single writing. For example, the camera main body 100 may perform control so that the write size does not exceed the remaining AU size also in a case where parts of DMV and MDAT are collectively recorded into the recording medium 200 through single writing. Note that the camera main body 100 does not adjust the write size if DMV to be recorded is divided as a result of the adjustment of the write size.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-163619, filed Aug. 31, 2018 which is hereby incorporated by reference herein in its entirety.

What is claimed is:

1. A recording apparatus, comprising at least one processor and/or at least one circuit which functions as:
  a control unit configured to repeatedly execute a recording operation of recording data into a recording medium having a recording area that includes a plurality of partial areas,
  wherein
  the control unit repeatedly executes the recording operation multiple times for recording a moving image file into the recording medium,
  the control unit performs control so that one partial area included among the plurality of partial areas is used as a recording destination, and when the one partial area is filled with recorded data, another partial area is used as a recording destination,
  when recording the moving image file into the recording medium, the control unit performs control so that, in a case where a recording size of data recorded in a single recording operation exceeds a remaining size of a partial area that is used as a recording destination in the single recording operation, adjustment processing is executed for temporarily changing the recording size in the single recording operation so that one partial area is used as a recording destination of data in the single recording operation, and
  the control unit performs control so that, in the case where a recording size of data recorded in a single recording operation exceeds a remaining size of a partial area that is used as a recording destination in the single recording operation, the single recording operation is executed for the partial area in accordance with the recording size which has been changed by the adjustment processing and a next recording operation is executed for another partial area in accordance with an original recording size which has not undergone the adjustment processing.

2. The recording apparatus according to claim 1, wherein a recording size of data recorded in a single recording operation is an integral multiple of a predetermined size, and
each of the partial areas includes a predetermined number of areas having the predetermined size.

3. The recording apparatus according to claim 1, wherein the control unit performs control so that the adjustment processing is executed when predetermined processing for starting the recording of the moving image file from a middle of a partial area has been executed, and the adjustment processing is not executed when the predetermined processing has not been executed.

4. The recording apparatus according to claim 1, wherein the moving image file contains moving image index data and moving image stream data, and
a recording size for recording the moving image index data and a recording size for recording the moving image stream data have each been preset in accordance with a format of the moving image file.

5. The recording apparatus according to claim 4, wherein the recording size of the moving image index data is a size with which the moving image index data is recordable in a single recording operation, and
the recording size of the moving image stream data is a size obtained by dividing a size of the partial area by an integer.

6. The recording apparatus according to claim 4, wherein in the adjustment processing, the control unit
  performs control so that, when data to be recorded in the single recording operation is the moving image index data, recording of a part of the data is executed in the single recording operation, and a remainder of the data is recorded into another partial area in a next single recording operation, and
  performs control so that, when data to be recorded in the single recording operation is the moving image stream data, recording of a part of the data is executed in the single recording operation, and data that includes a remainder of the data and has the recording size of the moving image stream data is recorded into another partial area in a next single recording operation.

7. The recording apparatus according to claim 4, wherein the control unit performs control so that the adjustment processing is executed when data to be recorded in a single recording operation is the moving image stream data, and the adjustment processing is not executed when data to be recorded in a single recording operation is the moving image index data.

8. The recording apparatus according to claim 1, wherein the recording medium is a memory card compliant with SD standards, and the partial area is an Allocation Unit.

9. The recording apparatus according to claim 3, wherein the control unit transmits a Resume AU command to the recording medium as the predetermined processing for starting the recording of the moving image file from the middle of the partial area.

10. The recording apparatus according to claim 1, further comprising:
  an image sensor configured to generate moving image data,
  wherein data recorded by the repetition of the recording operation is the moving image data generated by the image sensor.

11. A recording method executed by a recording apparatus, comprising:
  repeatedly executing a recording operation of recording data into a recording medium having a recording area that includes a plurality of partial areas,
  wherein the recording operation is repeatedly executed multiple times for recording a moving image file into the recording medium;
  in the repetition of the recording, performing control so that one partial area included among the plurality of partial areas is used as a recording destination, and when the one partial area is filled with recorded data, another partial area is used as a recording destination;
  in the repetition of the recording, when recording the moving image file into the recording medium, performing control so that, in a case where a recording size of data recorded in a single recording operation exceeds a remaining size of a partial area that is used as a recording destination in the single recording operation, adjustment processing is executed for temporarily changing the recording size in the single recording operation so that one partial area is used as a recording destination of data in the single recording operation, and
  performing control so that, in the case where a recording size of data recorded in a single recording operation exceeds a remaining size of a partial area that is used as a recording destination in the single recording operation, the single recording operation is executed for the partial area in accordance with the recording size which has been changed by the adjustment processing and a next recording operation is executed for another partial area in accordance with an original recording size which has not undergone the adjustment processing.

12. A non-transitory computer-readable storage medium which stores a program for causing a computer to execute a recording method comprising:
  repeatedly executing a recording operation of recording data into a recording medium having a recording area that includes a plurality of partial areas,
  wherein the recording operation is repeatedly executed multiple times for recording a moving image file into the recording medium;
  in the repetition of the recording, performing control so that one partial area included among the plurality of partial areas is used as a recording destination, and when the one partial area is filled with recorded data, another partial area is used as a recording destination;
  in the repetition of the recording, when recording the moving image file into the recording medium, performing control so that, in a case where a recording size of data recorded in a single recording operation exceeds a remaining size of a partial area that is used as a recording destination in the single recording operation, adjustment processing is executed for temporarily changing the recording size in the single recording operation so that one partial area is used as a recording destination of data in the single recording operation, and
  performing control so that, in the case where a recording size of data recorded in a single recording operation exceeds a remaining size of a partial area that is used as a recording destination in the single recording operation, the single recording operation is executed for the partial area in accordance with the recording size which has been changed by the adjustment processing and a next recording operation is executed for another partial area in accordance with an original recording size which has not undergone the adjustment processing.

* * * * *